United States Patent
Tanaka et al.

(10) Patent No.: US 11,363,807 B2
(45) Date of Patent: Jun. 21, 2022

(54) LEADER FOR FLY FISHING

(71) Applicant: Morris Company Ltd., Saitama (JP)

(72) Inventors: Seiji Tanaka, Saitama-ken (JP); Ichiro Arai, Saitama-ken (JP)

(73) Assignee: Varivas Co., Ltd, Iruma (JP)

( * ) Notice: Subject to any disclaimer, the term of this patent is extended or adjusted under 35 U.S.C. 154(b) by 0 days.

(21) Appl. No.: 17/052,082

(22) PCT Filed: Dec. 4, 2019

(86) PCT No.: PCT/JP2019/047449
§ 371 (c)(1),
(2) Date: Oct. 30, 2020

(87) PCT Pub. No.: WO2021/053837
PCT Pub. Date: Mar. 25, 2021

(65) Prior Publication Data
US 2021/0244009 A1    Aug. 12, 2021

(30) Foreign Application Priority Data
Sep. 18, 2019   (JP) .............................. JP2019-169411

(51) Int. Cl.
    *A01K 91/16*    (2006.01)
(52) U.S. Cl.
    CPC .................................... *A01K 91/16* (2013.01)
(58) Field of Classification Search
    CPC ...................................................... A01K 91/16
    See application file for complete search history.

(56) References Cited

U.S. PATENT DOCUMENTS

| | | | | |
|---|---|---|---|---|
| 3,758,979 A | * | 9/1973 | Martuch | A01K 91/16 428/157 |
| 3,864,865 A | * | 2/1975 | Swisher | A01K 91/16 43/44.98 |
| 5,625,976 A | * | 5/1997 | Goodale | D06M 15/227 52/258 |
| 5,718,077 A | | 2/1998 | Meinel | |

(Continued)

FOREIGN PATENT DOCUMENTS

| | | |
|---|---|---|
| JP | 2004180692 A | 7/2004 |
| WO | 2011089950 A1 | 7/2011 |

OTHER PUBLICATIONS

PCT/JP2019/047449, Written Opinion of International Searching Authority, 7 pages total (including English translation).

(Continued)

*Primary Examiner* — Jessica B Wong
(74) *Attorney, Agent, or Firm* — Gerald W. Roberts; John V. Daniluck; Dentons Bingham Greenebaum LLP

(57) ABSTRACT

A leader 10 for fly fishing proposed herein is formed of a single monofilament line. The leader 10 for fly fishing includes a tippet section 11 to which a fly is tied, a butt section 12 to which a fly line is tied, and an intermediate section 13 provided between the tippet section 11 and the butt section 12. Herein, the butt section 12 is thicker than the tippet section 11. The intermediate section 13 includes a front tapered portion 13a having a thickness that gradually increases from the tippet section 11, a rear tapered portion 13b having a thickness that gradually increases from the butt section 12, and a thicker portion than the butt section 12.

5 Claims, 4 Drawing Sheets

(56) References Cited

U.S. PATENT DOCUMENTS

| | | | | |
|---|---|---|---|---|
| 5,845,430 A | * | 12/1998 | Nakano | D01F 6/12 43/44.98 |
| 6,170,192 B1 | * | 1/2001 | Nakano | D01F 6/12 43/44.98 |
| 6,745,511 B1 | * | 6/2004 | Falconer | A01K 91/02 43/44.87 |

OTHER PUBLICATIONS

PCT/JP2019/047449, International Search Report, 5 pages total (including English translation).
"Accessory Tapered Leader," Mar. 31, 2017, p. 9, "Double tapered leader" <URL: http://katokebari.com/lineleader.htm>.
"Tyoukoki 2020" (Fishing diary 2020), Feb. 16, 2005, p. 4, "9 gatsu atama no Yabusawa" (Yabusawa at the beginning of September) <URL: http://www.ne.jp/asahi/heno/homepage/tyouko2000.html>.
"Fly Fishing de asobu" (Play with fly fishing), Sep. 24, 2009, pp. 1-2 <URL: http://blog.yozawa.jp/?eid=1482041>.
Canadian Intellectual Property Office, Canadian Patent Appln. 3,099,059, First Office Action, 5 pgs. dated Jan. 6, 2022.

* cited by examiner

LEADER FOR FLY FISHING

TECHNICAL FIELD

The present disclosure relates to a leader for flying fishing.

The present application claims priority from Japanese Patent Application No. 2019-169411 filed on Sep. 18, 2019, before the Japanese Patent Office, which is incorporated by reference herein in its entirety.

BACKGROUND ART

JP 2004-180692A discloses a leader for fly fishing. Herein, as disclosed in JP 2004-180692A, fly fishing is a fishing method in which a fly is casted without a weight or a float from a remote position where fish is unable to sense casting and the fly is drifted on or in water to catch fish. To meet such requirements for fly fishing, six parts, that is, a fly rod, a reel, a fly line, a leader, a tippet, and a fly, are used in fly fishing. The leader preferably has a reduced thread diameter to realize natural drift of the fly. The leader needs to include a tapered section through which an inertial force is transmitted smoothly from the fly line upon casting to quietly drop the fly on a water surface. Therefore, the leader includes a portion called butt, having a large thread diameter, and connected to the fly line, a portion called taper and having a tapered shape, and a portion called tippet section to which a tippet with a small diameter to which the fly is attached is connected. The tippet is connected to the tippet section of the leader and the fly is attached to the tippet. Note that the fly may be directly attached to the tippet section at a tip of the leader. In this case, the tippet can be omitted.

In JP 2004-180692A, a leader for fly fishing which is formed of a vinylidene fluoride resin-based monofilament, includes a butt section, a tapered portion, and a tippet section that are continuously formed, and is formed such that unevenness of a thread in the tippet section is 10% or less and unevenness of a thread in the butt section is 20% or less is further described as an example. It is described that, according to the above described configuration, a leader for fly fishing configured such that movement of a fly is not restricted, curl of the thread can be easily eliminated, the unevenness of the thread in the tippet section is small, and enough strength to endure shock from biting is realized is provided.

CITATION LIST

Patent Document

PATENT DOCUMENT 1: JP 2004-180692A

SUMMARY OF THE INVENTION

Technical Problem

Incidentally, the present inventor wanted to provide a leader for fly fishing which can exhibit desired casting property and drift property in accordance with needs of a user (an angler) in fly fishing. The present inventor therefore proposes a leader for fly fishing in a new form deviating from the preconceived concept of a leader for fly fishing.

Solution to the Problem

A leader for fly fishing proposed herein is formed of a single monofilament line. The leader for fly fishing includes a tippet section to which a fly is tied, a butt section to which a fly line is tied, and an intermediate section provided between the tippet section and the butt section. The butt section is thicker than the tippet section. The intermediate section includes a front tapered portion having a thickness that gradually increases from the tippet section, a rear tapered portion having a thickness that gradually increases from the butt section, and a thicker portion than the butt section.

DESCRIPTION OF EMBODIMENTS

Embodiments of a leader for fly fishing proposed herein will be described below with reference to the accompanying drawings. Note that the present disclosure is not limited to the following embodiments. The accompanying drawings are schematic and may not reflect an actual leader.

Figure 1:
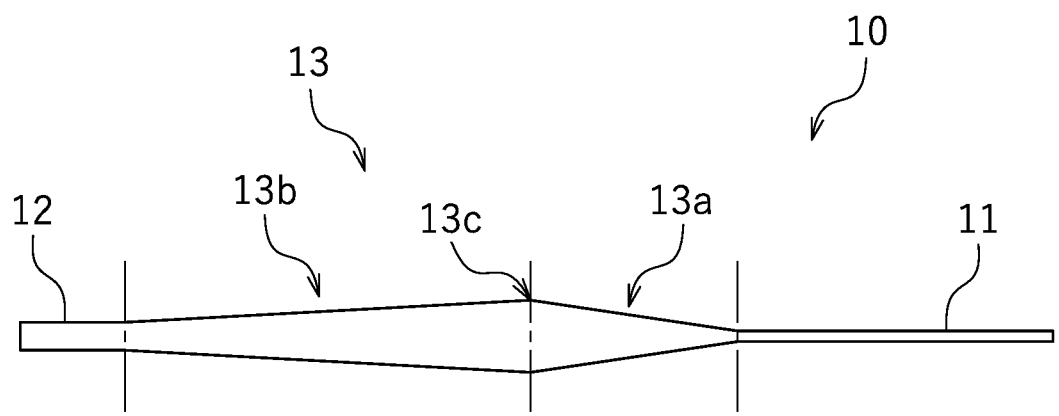
FIG. 1 is a side view schematically illustrating an embodiment of a leader 10 for flying fishing proposed herein.
Figure 2:
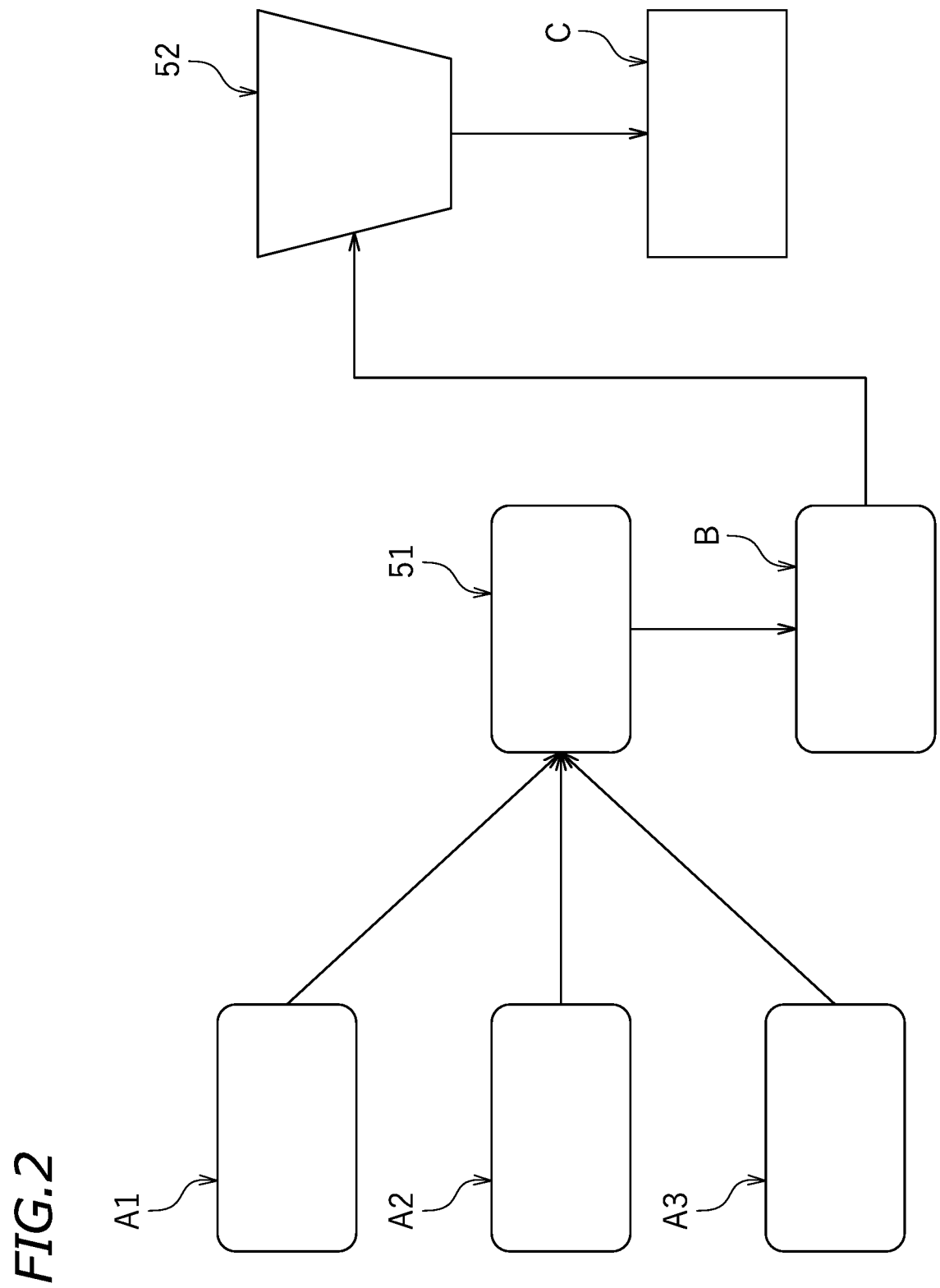
FIG. 2 is a process chart illustrating steps of producing the leader 10 for fly fishing.

FIG. 1 is a side view schematically illustrating an embodiment of a leader 10 for fly fishing proposed herein. In FIG. 1, the leader 10 is illustrated such that change in thickness of the leader 10 with respect to a length direction is understood, and a ratio of the thickness with respect to the length direction is different from an actual ratio. FIG. 2 is a process chart illustrating steps of producing the leader 10 for fly fishing.

In the steps of producing the leader 10 for fly fishing, for example, as illustrated in FIG. 2, a tumbler 51 and an extruder 52 are included. The tumbler 51 is a so-called mixing machine. In the tumbler 51, raw materials A1 and A2 and an add-in material A3 used for producing the leader 10 are put and mixed. The extruder 52 is a device that melts a mixed raw material B and extrudes the melted raw material B in a thread form. A melt spinning temperature can be any temperature in a range from a melting point of the melted raw material B or more to a thermal decomposition temperature of the raw material B or less and, a temperature range in which stable spinning is maintained may be found in accordance with the melted raw material B. The present inventor conducted various experiments and found that, in the extruder 52, a thickness of a thread was adjusted, for example, by adjusting a pressure that pushes out the melted raw material. Based on the finding of the present inventor, for example, it is possible to gradually increase the thickness of the thread that is extruded during spinning, and thereafter, gradually reduce the thickness of the thread.

The leader 10 for fly fishing is formed of a single monofilament line. Herein, the leader 10 can be a thread made of a synthetic resin, such as nylon, polypropylene, polyester, fluorocarbon, or the like. For example, an additive, such as a plasticizer, a thermal stabilizer, an acrylic resin, a crystal nucleating agent, a lubricant, or the like, and a colorant are added to a resin made of nylon, polypropylene, polyester, fluorocarbon, or the like, as appropriate. Resins that are the raw materials A1 and A2, and the add-in material A3, such as an additive, a colorant, or the like, are uniformly mixed by the tumbler 51. The mixed raw material B is melted, is extruded with a predetermined thickness by the extruder 52, is cooled down, and thereafter, is stretched out, thereby forming a monofilament line C.

The leader 10 for fly fishing includes a tippet section 11 to which a fly is tied, a butt section 12 to which a fly line is tied, and an intermediate section 13 provided between the tippet section 11 and the butt section 12. In the leader 10, the butt section 12 is thicker than the tippet section 11. In the leader 10, a tippet section 11 side is assumed as a front side and a butt section 12 side is assumed as a rear side in the length direction, as appropriate.

Herein, the tippet section 11 is a portion to which the fly is tied, is the thinnest in the entire leader 10, and has a desired length. Note that the tippet section 11 may be formed to have desired flexibility that is necessary for realizing natural movement of the fly and desired tensile strength and knot strength that are enough not to cause breakage of the thread when landing fish. The tippet section 11 is formed to have an almost uniform thickness. The tippet section 11 has a length of about 30 cm to 200 cm. A diameter of the tippet section 11 is about 0.10 mm to 0.37 mm.

The butt section 12 is a portion to which the fly line is tied and is required to have desired tensile strength enough not to cause breakage of the thread when landing fish, but is not required to have flexibility, as compared to the tippet section 11. Therefore, the butt section 12 is formed to be thicker than the tippet section 11 and has a desired length. The butt section 12 is formed to have an almost uniform thickness. The butt section 12 has a length of about 20 cm to 50 cm. A diameter of the butt section 12 is about 0.43 mm to 0.58 mm. The diameter of the butt section 12 may be, for example, 1.5 to 4 times as large as that of the tippet section 11. The butt section 12 is tied to the fly line. In order to reduce a size of a knot of the butt section 12 and the fly line, the butt section 12 is preferably thin. However, when the butt section 12 is too thin, a transmission loss of force from the fly line occurs. Therefore, the leader 10 for fly fishing including the butt section 12 having a thickness with which balance between reduction in size of the knot of the fly line and transmission of force from the fly line is achieved may be employed, as appropriate.

The intermediate section 13 is provided between the tippet section 11 and the butt section 12. The intermediate section 13 includes a front tapered portion 13a having a thickness that gradually increases from the tippet section 11 and, a rear tapered portion 13b having a thickness that gradually increases from the butt section 12, and a portion 13c that is thicker than the butt section 12. The intermediate section 13 has a length of about 200 cm to 400 cm. Note that, herein, the front tapered portion 13a is a portion of the intermediate section 13 which has a thickness that gradually increases from the tippet section 11 side in the length direction. The rear tapered portion 13b is a portion of the intermediate section 13 which has a thickness that gradually increases from the butt section 12 side in the length direction. In other words, in the front tapered portion 13a, a taper is set such that the thickness thereof gradually reduces toward the tippet section 11. In the rear tapered portion 13b, a taper is set such that the thickness thereof gradually reduces toward the butt section 12.

In the embodiment illustrated in FIG. 1, the front tapered portion 13a is formed to have a thickness that gradually increases from the tippet section 11 and the rear tapered portion 13b is formed to be continuous from a thickest portion of the front tapered portion 13a at a rear end. In other words, the rear tapered portion 13b continuously extends from the thickest portion of the front tapered portion 13a at the rear end and has a thickness that gradually reduces toward the butt section 12. Therefore, in this embodiment, the rear tapered portion 13b is thicker than the butt section 12. A boundary portion of the front tapered portion 13a and the rear tapered portion 13b is a thickest portion in the intermediate section 13. In the embodiment illustrated in FIG. 1, the rear tapered portion 13b is longer than the front tapered portion 13a and has a more gradual taper than that of the front tapered portion 13a.

According to the above described leader 10 for fly fishing, the intermediate section 13 has a larger weight per unit length than that of the butt section 12. Therefore, a heavy portion is provided in a portion of the leader 10 which is closer to the tippet section 11, that is, in other words, a front portion of the leader 10. Thus, a centrifugal force is easily created in the fly line and the leader 10 when throwing the fly. As described above, the leader 10 for fly fishing has a good so-called turn performance. On the other hand, the tippet section 11 is thin, and therefore, the fly can be naturally drifted after being casted. As described above, the leader 10 for fly fishing has a good drift property. Herein, a diameter of the boundary portion of the intermediate section 13 which has the largest thickness may be, for example, 1.2 to 1.3 times as large as that of the butt section 12.

Note that the above described leader 10 for fly fishing is a monofilament line and, unlike a twisted multifilament yarn, water hardly permeates therein. For example, in a case in which the leader 10 for fly fishing is formed of a nylon monofilament line, the leader 10 absorbs water to some extent because of properties of nylon in some cases. The thickness of the intermediate section 13 changes with respect to the length direction. The leader 10 for fly fishing proposed herein is a monofilament line and is formed such that the thickness of the intermediate section 13 changes. Accordingly, an outer diameter of the leader 10 smoothly changes, a specific gravity thereof is kept substantially constant, and therefore, a good drift property is achieved. The length of the tippet section of the leader for fly-fishing reduces as the fly is retied several times. Therefore, a separately sold tippet is cut out from a spool by a desired length and is tied and added to the leader in some cases. In other cases, a separately sold tippet is tied to the leader at beginning and then a desired length of tippet is added later. As described above, there are cases in which another thread is tied to the tippet section 11 of the leader for fly fishing. Furthermore, in accordance with an angler's preference, any one of threads with different thicknesses is tied at an arbitrary position and is used as a leader for fly fishing in some cases. However, a knot serves air resistance upon casting and the turn performance is deteriorated. There are also cases in which a trash or the like is tangled in a knot and disturbs fishing. In another case, the strength is reduced at a knot. To cope with the above described inconveniences, the leader 10 for fly fishing proposed herein is a monofilament line and does not have a knot. Therefore, the leader 10 easily exhibits good turn performance and drift property as well as other desired performances.

Figure 3:
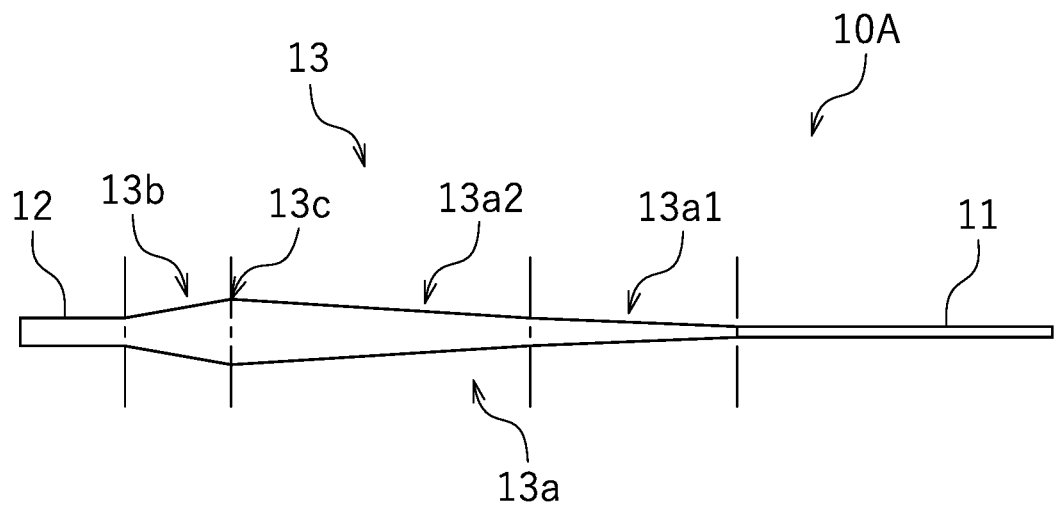
FIG. 3 is a side view schematically illustrating a leader 10A for fly fishing according to another embodiment.
Figure 4:
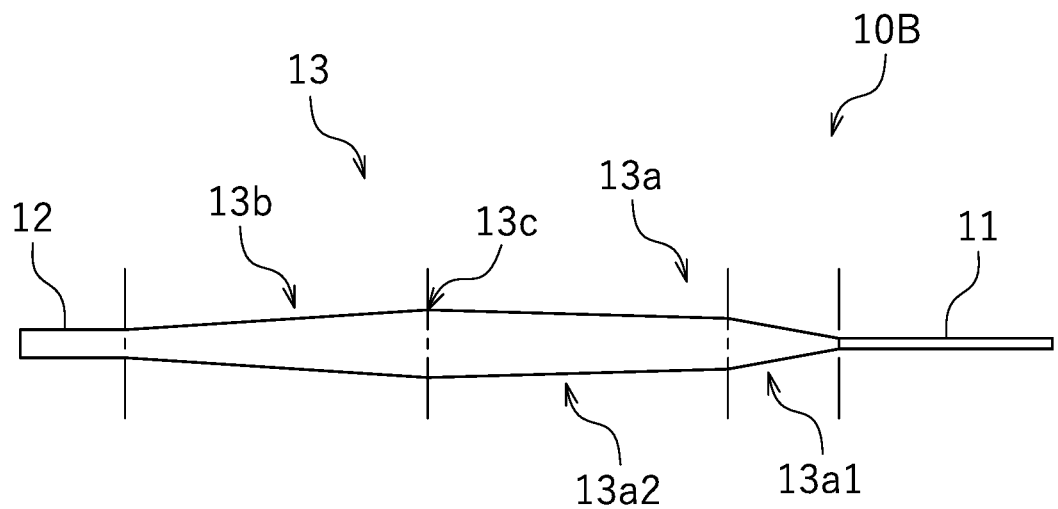
FIG. 4 is a side view schematically illustrating a leader 10B for fly fishing according to yet another embodiment.
Figure 5:
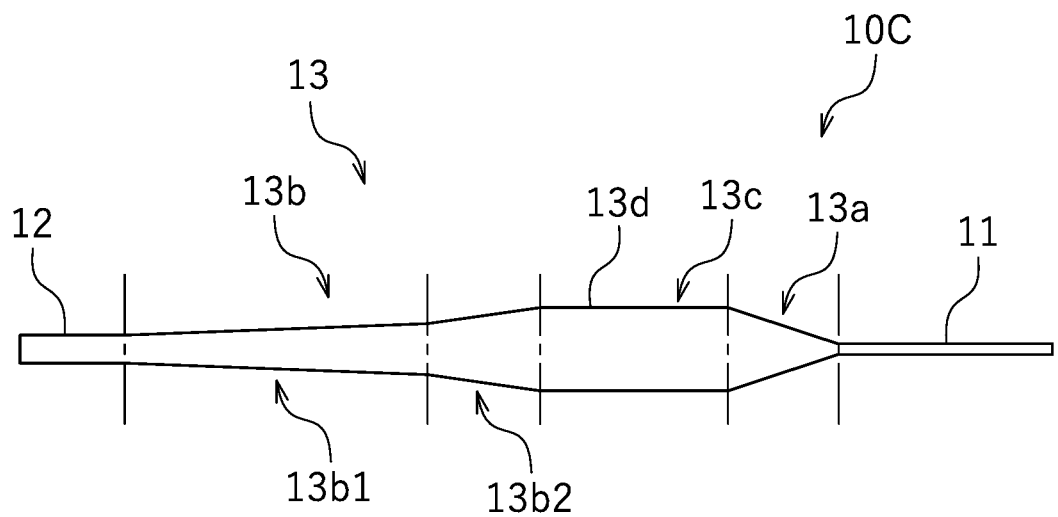
FIG. 5 is a side view schematically illustrating a leader 10C for fly fishing according to still another embodiment.

The leader for fly fishing proposed herein is not limited to the embodiment illustrated in FIG. 1. FIG. 3 to FIG. 5 are side views schematically illustrating leaders 10A to 10C for fly fishing according to other embodiments. In FIG. 3 to FIG. 5, the leaders 10A to 10C are illustrated such that changes in thicknesses of the leaders 10A to 10C with respect to the length direction are understood, and a ratio of each of the thicknesses with respect to the length direction is different from an actual ratio.

In the leader 10A for fly fishing illustrated in FIG. 3, a front tapered portion 13*a* is set to be larger than a rear tapered portion 13*b*. In the embodiment illustrated in FIG. 3, the front tapered portion 13*a* is formed such that a first front tapered portion 13*a*1 located closer to the tippet section 11 and a second front tapered portion 13*a*2 located closer to the rear tapered portion 13*b* have different tapers. Specifically, the front tapered portion 13*a* is formed such that the first front tapered portion 13*a*1 located closer to the tippet section 11 has a more gradual taper than that of the second front tapered portion 13*a*2 located closer to the rear tapered portion 13*b*.

In the leader 10A for fly fishing illustrated in FIG. 3, the front tapered portion 13*a* is set to be longer than the rear tapered portion 13*b*, and therefore, the tippet section 11 tends to move in a more natural manner. Therefore, the fly has a good drift property after being casting. In the embodiment illustrated in FIG. 3, the front tapered portion 13*a* is formed such that the first front tapered portion 13*a*1 located closer to the tippet section 11 has a more gradual taper than that of the second front tapered portion 13*a*2 located closer to the rear tapered portion 13*b*. In this respect, as compared to the embodiment illustrated in FIG. 1, a portion of the intermediate section 13 located closer to the tippet section 11 is flexible and movement of the tippet section 11 tend to be more natural, thus contributing to increase in the drift property of the fly. Moreover, because the portion of the intermediate section 13 located closer to the tippet section 11 is flexible, an impact made upon casting or when the leader 10A for fly fishing and the fly land on water tends to be small. In this embodiment, a length of the front tapered portion 13*a* may be 1.8 to 2.2 times as large as that of the rear tapered portion 13*b*. A length of the first front tapered portion 13*a*1 may be 0.8 to 1.2 times as large as that of the second front tapered portion 13*a*2. As described above, in the leader for fly fishing proposed herein, the front tapered portion 13*a* may be formed longer than the rear tapered portion 13*b*. Conversely, the rear tapered portion 13*b* may be formed longer than the front tapered portion 13*a*.

In the leader 10B for fly fishing illustrated in FIG. 4, a front tapered portion 13*a* and a rear tapered portion 13*b* have substantially the same length. In the embodiment illustrated in FIG. 4, the front tapered portion 13*a* is formed such that a first front tapered portion 13*a*1 located closer to the tippet section 11 and a second front tapered portion 13*a*2 located closer to the rear tapered portion 13*b* have different tapers. Specifically, the front tapered portion 13*a* is formed such that the second front tapered portion 13*a*2 located closer to the rear tapered portion 13*b* has a more gradual taper than that of the first front tapered portion 13*a*1 located closer to the tippet section 11. In the leader 10B for fly fishing illustrated in FIG. 4, the front tapered portion 13*a* and the rear tapered portion 13*b* have the substantially same length. In this embodiment, the center of gravity of the leader 10B is arranged substantially in an intermediate position of the intermediate section 13. Therefore, according to this embodiment, the fly can be easily controlled upon casting and an increased drift property is achieved. As described above, the leader 10B for fly fishing has a shape that exhibits the casting property and the drift property in good balance.

As described above, the front tapered portion 13*a* may be formed such that the portion located closer to the tippet section 11 and the portion located closer to the rear tapered portion 13*b* have different tapers. For example, as illustrated in FIG. 3, the front tapered portion 13*a* may include the first front tapered portion 13*a*1 having a thickness that gradually increases from the tippet section 11 and the second front tapered portion 13*a*2 having a thickness that gradually increases from the rear end of the first front tapered portion 13*a*1 with respect to the length direction at a larger rate as compared to increase in the thickness of the first front tapered portion 13*a*1. Also, as illustrated in FIG. 4, the front tapered portion 13*a* may include the first front tapered portion 13*a*1 having a thickness that gradually increases from the tippet section 11 and the second front tapered portion 13*a*2 having a thickness that gradually increases from the rear end of the first front tapered portion 13*a*1 with respect to the length direction at a smaller rate as compared to increase in the thickness of the first front tapered portion 13*a*1.

The intermediate section 13 of the leader 10C for fly fishing illustrated in FIG. 5 includes a non-tapered portion 13*d* having a constant thickness between the front tapered portion 13*a* and the rear tapered portion 13*b*. In the embodiment illustrated in FIG. 5, the front tapered portion 13*a* has a thickness that gradually increases from the tippet section 11 toward a front end of the non-tapered portion 13*d*. The rear tapered portion 13*b* includes a first rear tapered portion 13*b*1 located closer to the butt section 12 and a second rear tapered portion 13*b*2 located closer to the non-tapered portion 13*d*. The first rear tapered portion 13*b*1 and the second rear tapered portion 13*b*2 have different tapers. Specifically, the rear tapered portion 13*b* is formed such that the first rear tapered portion 13*b*1 located closer to the butt section 12 has a more gradual taper than that of the second rear tapered portion 13*b*2 located closer to the non-tapered portion 13*d*. In the leader 10C for fly fishing illustrated in FIG. 5, the non-tapered portion 13*d* of the intermediate section 13 has a large thickness and the center of gravity of the leader 10C is arranged therein. Therefore, a centrifugal force can be easily achieved through the leader 10C and the fly can be easily controlled upon casting.

As described above, in the embodiment illustrated in FIG. 5, a length of the non-tapered portion 13*d* can be arbitrarily determined. For example, ⅒ to ⅓ of the length of the intermediate section 13 may be made to be the non-tapered portion 13*d*. A ratio between the lengths of the front tapered portion 13*a* and the rear tapered portion 13*b* between which the non-tapered portion 13*d* is sandwiched is not limited to that illustrated in FIG. 5. In FIG. 5, the rear tapered portion 13*b* is longer than the front tapered portion 13*a*. However, the front tapered portion 13*a* may be formed longer than the rear tapered portion 13*b*. Moreover, the rear tapered portion 13*b* includes the first rear tapered portion 13*b*1 and the second rear tapered portion 13*b*2 that have different tapers, but a constant taper may be provided to the rear tapered portion 13*b*. The front tapered portion 13*a* may include the first front tapered portion 13*a*1 and the second front tapered portion 13*a*2 that have different tapers.

The rear tapered portion 13*b* may be formed such that a portion located closer to the butt section 12 and a portion located closer to the front tapered portion 13*a* have different tapers. For example, as illustrated in FIG. 5, the rear tapered portion 13*b* may include the first rear tapered portion 13*b*1 having a thickness that gradually increases from the butt section 12 and the second rear tapered portion 13*b*2 having a thickness that gradually increases from the front end of the first rear tapered portion 13*b*1 with respect to the length direction at a larger rate as compared to increase in the thickness of the first rear tapered portion 13*b*1. Although not illustrated, the rear tapered portion 13*b* may include the first rear tapered portion 13*b*1 having a thickness that gradually increases from the butt section 12 and the second rear tapered portion 13b2 having a thickness that gradually increases from the front end of the first rear tapered portion 13b1 with respect to the length direction at a smaller rate as compared to increase in the thickness of the first rear tapered portion 13b1. In the leader 10C for fly fishing, the non-tapered portion 13d has the largest thickness, and the non-tapered portion 13d is set long, so that a weight of the leader 10C is increased. Moreover, the non-tapered portion 13d is set short, so that the increase in the weight of the leader 10C is restrained small. By adjusting the length and position of the non-tapered portion 13d (changing the lengths of the front tapered portion 13a and the rear tapered portion 13b), a leader for fly fishing specialized for the drift property while importance is placed on the turn performance can be provided.

Embodiments of the leader for fly fishing proposed herein have been described above. However, the present disclosure is not limited to the above described embodiments. For example, various changes can be made to the leader for fly fishing proposed herein and each of components and processes described herein can be omitted as appropriate or can be combined with another one or other ones of the components and the processes as appropriate, unless a particular problem occurs.

DESCRIPTION OF REFERENCE CHARACTERS 10, 10A to 10C Leader for fly fishing
11 Tippet section
12 Butt section
13 Intermediate section
13a Front tapered portion
13b Rear tapered portion
13c Thicker portion than the butt section 12
13d Non-tapered portion
51 Tumbler
52 Extruder

What is claimed is:

1. A leader for fly fishing formed of a single monofilament line, the leader comprising:
a tippet section to which a fly is tied;
a butt section to which a fly line is tied; and
an intermediate section provided between the tippet section and the butt section, wherein the butt section is thicker than the tippet section, the intermediate section includes a front tapered portion having a thickness that gradually increases from the tippet section, a rear tapered portion having a thickness that gradually increases from the butt section, and a thicker portion than the butt section
wherein the front tapered portion includes a first front tapered portion having a thickness that gradually increases from the tippet section, and a second front tapered portion having a thickness that gradually increases from a rear end of the first front tapered portion with respect to a length direction at a larger rate as compared to increase in the thickness of the first front tapered portion.

2. A leader for fly fishing formed of a single monofilament line, the leader comprising:
a tippet section to which a fly is tied;
a butt section to which a fly line is tied; and
an intermediate section provided between the tippet section and the butt section, wherein the butt section is thicker than the tippet section, the intermediate section includes a front tapered portion having a thickness that gradually increases from the tippet section, a rear tapered portion having a thickness that gradually increases from the butt section, and a thicker portion than the butt section wherein the front tapered portion includes a first front tapered portion having a thickness that gradually increases from the tippet section, and a second front tapered portion having a thickness that gradually increases from a rear end of the first front tapered portion with respect to a length direction at a smaller rate as compared to increase in the thickness of the first front tapered portion.

3. A leader for fly fishing formed of a single monofilament line, the leader comprising:
a tippet section to which a fly is tied;
a butt section to which a fly line is tied; and
an intermediate section provided between the tippet section and the butt section, wherein the butt section is thicker than the tippet section, the intermediate section includes a front tapered portion having a thickness that gradually increases from the tippet section, a rear tapered portion having a thickness that gradually increases from the butt section, and a thicker portion than the butt section wherein the rear tapered portion includes a first rear tapered portion having a thickness that gradually increases from the butt section, and a second rear tapered portion having a thickness that gradually increases from a front end of the first rear tapered portion with respect to a length direction at a larger rate as compared to increase in the thickness of the first rear tapered portion.

4. A leader for fly fishing formed of a single monofilament line, the leader comprising:
a tippet section to which a fly is tied;
a butt section to which a fly line is tied; and
an intermediate section provided between the tippet section and the butt section, wherein the butt section is thicker than the tippet section, the intermediate section includes a front tapered portion having a thickness that gradually increases from the tippet section, a rear tapered portion having a thickness that gradually increases from the butt section, and a thicker portion than the butt section wherein the rear tapered portion includes a first rear tapered portion having a thickness that gradually increases from the butt section, and a second rear tapered portion having a thickness that gradually increases from a front end of the first rear tapered portion with respect to a length direction at a smaller rate as compared to increase in the thickness of the first rear tapered portion.

5. A leader for fly fishing formed of a single monofilament line, the leader comprising:
a tippet section to which a fly is tied;
a butt section to which a fly line is tied; and
an intermediate section provided between the tippet section and the butt section, wherein the butt section is thicker than the tippet section, the intermediate section includes a front tapered portion having a thickness that gradually increases from the tippet section, a rear tapered portion having a thickness that gradually increases from the butt section, and a thicker portion than the butt section wherein the intermediate section includes a non-tapered portion having a constant thickness between the front tapered portion and the rear tapered portion.

* * * * *

UNITED STATES PATENT AND TRADEMARK OFFICE
CERTIFICATE OF CORRECTION

PATENT NO. : 11,363,807 B2
APPLICATION NO. : 17/052082
DATED : June 21, 2022
INVENTOR(S) : Seiji Tanaka and Ichiro Arai It is certified that error appears in the above-identified patent and that said Letters Patent is hereby corrected as shown below:

On the Title Page

Item (71) Applicant, please delete "Morris Company Ltd, Saitama (JP)" and insert in lieu thereof --Varivas Co., Ltd, Iruma (JP)--.

Signed and Sealed this
Twentieth Day of September, 2022

Katherine Kelly Vidal
*Director of the United States Patent and Trademark Office*